(12) United States Patent
Lehto et al.

(10) Patent No.: US 7,776,171 B2
(45) Date of Patent: Aug. 17, 2010

(54) ARRANGEMENT AND METHOD FOR TREATMENT OF A MATERIAL BY MEANS OF AN ULTRASONIC DEVICE

(75) Inventors: Marcus Lehto, Fotö (SE); Hans Nyqvist, Mölndal (SE); Erik Yngvesson, Vårgårda (SE)

(73) Assignee: SCA Hygiene Products AB, Gothenburg (SE)

( * ) Notice: Subject to any disclaimer, the term of this patent is extended or adjusted under 35 U.S.C. 154(b) by 198 days.

(21) Appl. No.: 12/017,119

(22) Filed: Jan. 21, 2008

(65) Prior Publication Data

US 2008/0110550 A1    May 15, 2008

Related U.S. Application Data

(63) Continuation of application No. PCT/SE2005/001169, filed on Jul. 20, 2005.

(51) Int. Cl.
  *B32B 37/00* (2006.01)
(52) U.S. Cl. .................. 156/64; 156/73.1; 156/351; 156/378; 156/580.1
(58) Field of Classification Search .................. 156/64, 156/73.1, 73.4, 351, 358, 359, 360, 378, 156/379, 580.1, 580.2; 425/174.2; 264/442, 264/443, 444, 445; 228/1.1, 110.1
See application file for complete search history.

(56) References Cited

U.S. PATENT DOCUMENTS 6,036,796 A    3/2000 Halbert et al.
6,190,296 B1   2/2001 Gnad et al.

(Continued)

FOREIGN PATENT DOCUMENTS

DE    100 24 036 C1    2/2002

(Continued)

OTHER PUBLICATIONS

PCT/ISA/210.

(Continued)

*Primary Examiner*—James Sells
(74) *Attorney, Agent, or Firm*—Buchanan Ingersoll & Rooney PC

(57) ABSTRACT

An arrangement (1) for the treatment of a material (7, 8; 7', 8'; 7", 8"; 18) having at least two layers of material by an ultrasonic device (2) having an ultrasonic horn (3) arranged in conjunction with an abutment (5), in conjunction with which the material (7, 8; 7', 8'; 7", 8"; 18) is positioned in a gap (6) that is defined between the ultrasonic horn (3) and the abutment (5), and the ultrasonic horn (3) and/or the abutment (5) is/are so arranged as to be capable of displacement to permit adjustment of the size of the gap (6), for which purpose the arrangement (1) also includes a control unit (13) for the regulation of the size of the gap (6) dependent on the energy supplied to the material in the course of the treatment. The arrangement further includes a detection device (16) for the determination of at least one predetermined dimension ($b_1$; $d_1$; $b_3$) of the material (7, 8; 7', 8'; 7", 8"; 18), in conjunction with which the control unit (13) is arranged for the regulation of the size of the gap (6) dependent on at least the dimension ($b_1$; $d_1$; $b_3$).

10 Claims, 6 Drawing Sheets

U.S. PATENT DOCUMENTS 6,336,803 B1 * 1/2002 Funger et al. ............... 425/141
6,508,641 B1 * 1/2003 Kubik .................... 425/174.2
6,673,178 B2 * 1/2004 Ellner et al. ............... 156/73.1

FOREIGN PATENT DOCUMENTS

| DE | 103 31 064 A1 | 2/2005 |
| --- | --- | --- |
| SU | 1519915 A1 | 11/1989 |
| WO | WO 2004/091841 A1 | 10/2004 |

OTHER PUBLICATIONS

PCT/ISA/237.

* cited by examiner

ARRANGEMENT AND METHOD FOR TREATMENT OF A MATERIAL BY MEANS OF AN ULTRASONIC DEVICE

CROSS-REFERENCE TO RELATED APPLICATIONS

The present application is a continuation of PCT/SE2005/001169, filed on Jul. 20, 2005, the entire contents of which is incorporated herein by reference.

TECHNICAL FIELD

The present disclosure relates to an arrangement for the treatment of a material comprising at least two layers of material by means of an ultrasonic device comprising an ultrasonic horn arranged in conjunction with an abutment, for which purpose the aforementioned material is positioned in a gap that is defined between the aforementioned ultrasonic horn and the aforementioned abutment, and the aforementioned ultrasonic horn and/or the aforementioned abutment is/are so arranged as to be capable of displacement to permit adjustment of the size of the gap, for which purpose the arrangement also comprises a control unit for regulation of the size of the gap dependent on the energy supplied to the material in the course of the aforementioned treatment.

The disclosure also relates to a method for treating a material comprising at least two layers of material by means of an ultrasonic device comprising an ultrasonic horn arranged in conjunction with an abutment, for which purpose the aforementioned method comprises: positioning of the aforementioned material in a gap that is defined between the aforementioned ultrasonic horn and the aforementioned abutment, adjustment of the size of the gap by means of a movable adjustment of the aforementioned ultrasonic horn and/or the aforementioned abutment, and regulation of the size of the gap dependent on the energy supplied to the material in the course of the aforementioned treatment.

BACKGROUND

Ultrasonic technology is used in certain processes that are arranged for the treatment of continuous webs of material. This technology is already familiar and is suitable, for example, for the joining together of two layers of material of the nonwoven material type or other relatively thin layers of material. In the case of such joining together, also known as ultrasonic welding, a laminate is formed from the two layers of material. Such laminates are commonly encountered in the production of absorbent articles such as diapers, incontinence pads, sanitary towels and panty liners.

In addition to its use for the joining together of various materials, ultrasonic technology can also be used for other types of treatment, for example perforation, cutting, embossing of patterns or forming of material. As an example of materials that are suitable for treatment by means of ultrasonic technology, mention can be made of nonwoven material, i.e. fibrous materials for example with synthetic fibres such as polyethylene, polypropylene, polyester, nylon or the like. Mixtures of different types of fibre can also be used. Ultrasonic technology can also be used for the treatment of, for example, thermoplastic films made of polyethylene or polypropylene.

As far as concerns treatment in the form of joining together two materials intended for absorbent articles, an ultrasonic device is normally used in such a way that the materials are supplied in the form of continuous webs of material or discrete articles that are fed past or positioned in association with an ultrasonic horn belonging to the ultrasonic device and an abutment surface. This abutment surface is suitably defined by a rotating abutment roller or a plane surface which functions as an abutment. The materials are accordingly positioned in a relatively small gap that is formed between the ultrasonic horn and the abutment roller. In order to achieve the desired joining together of the two webs of material, the ultrasonic device is driven at a certain amplitude and with a certain power.

In normal applications, it is desirable to maintain a gap between the ultrasonic horn and the abutment surface that remains essentially constant. It is possible to establish, however, that a certain quantity of heat is generated during operation with the ultrasonic horn. This generation of heat normally leads to thermal expansion, inter alia in the ultrasonic horn, which in turn leads to a change in the size of the gap. A change in the size of the gap can also occur as a result of wear in the ultrasonic horn, in particular in its end part that is in fact applied to the subjacent material. This is a disadvantage in normal circumstances, since the treatment with the ultrasonic device can then lead to an unsatisfactory result. For example, an excessively small gap will lead to an excessively high level of supplied energy during treatment, which can lead to damage to the material. The opposite situation, that is to say an excessively large gap, can potentially produce an insufficient welding effect and thus poor joining together of the materials in question.

In order to solve the above-mentioned problems, the use of an ultrasonic device in which the size of the aforementioned gap can be regulated is previously disclosed. This can be done in this instance by causing the ultrasonic device to be displaced by mechanical means in relation to the abutment surface. This regulation, for the purpose of which the ultrasonic device and/or the abutment is movably arranged, can then take place dependent on various parameters which reflect the operating status of the ultrasonic device.

Patent document U.S. Pat. No. 6,190,296 shows a system of ultrasonic treatment, the purpose of which is to solve the above-mentioned problem. In accordance with this document, a sensor of the load cell type is used, with the help of which the force that acts from the ultrasonic horn and upon the abutment roller can be detected. A signal which corresponds to the measured force is fed to a control unit, which in turn is so arranged as to provide control of the ultrasonic device for regulating the size of the gap dependent on the aforementioned force. The size of the gap can thus be regulated continuously to an optimal value, so that an essentially identical level of energy is supplied to the materials during the process in question. The purpose of this in turn is to provide uniform and predictable ultrasonic treatment.

In spite of the previous disclosure of the principle of regulating the size of the gap dependent on the force with which the ultrasonic device influence the material and the abutment, it is possible to establish that the need for improvements relating to this type of regulation may arise in certain situations. For example, the prior art does not provide sufficiently uniform and dependable treatment using ultrasonic technology in respect of the joining together of two webs of material to form a laminate. If one material is narrower than the other, for example, it is difficult to obtain a uniform and strong joint between the webs of material, which in turn can be attributable to variations in dimensions, density or other characteristics of the constituent materials along the two webs of material.

Against the background of the foregoing, it is possible to establish that the need exists for arrangements and methods which utilize ultrasonic technology, and the purpose of which is to provide the more uniform, more durable and more effective sealing of laminates consisting of two or more layers of material.

OBJECTS AND SUMMARY

A principal object is to solve the above-mentioned problems and to make available uniform and reliable treatment by means of an ultrasonic device, in particular in conjunction with the joining together of at least two webs of material.

The above object is achieved by means of an arrangement of the kind mentioned by way of introduction, which comprises a detection arrangement for the purpose of determining at least one predetermined dimension of the aforementioned material, in conjunction with which the aforementioned control unit is arranged for the regulation of the size of the gap dependent on at least the aforementioned dimension.

The object is also achieved by means of a method of the kind mentioned by way of introduction, which comprises the detection of at least one predetermined dimension of the aforementioned material, as well as regulation of the size of the gap dependent on at least the aforementioned dimension.

A significant advantage is achieved, in the sense that the energy supplied to the material during treatment can be kept at a highly uniform value, since the aforementioned measured dimension is utilized as an input parameter for the purpose of regulating the size of the gap. Dimensional measurement in the form of a measurement of the width of a constituent material is preferably utilized. Regulation of the size of the gap is thus obtained as a function of the actual width of the material, which leads to a very uniform treatment of high quality, for example in the context of joining together two webs of nonwoven material. This is attributable not least to the fact that the energy that is supplied with the help of the ultrasonic treatment can be adapted to the actual dimensions of the constituent material.

An arrangement for optical inspection is utilized in conjunction with the aforementioned dimensional measurement. By utilizing a video camera, for example, arranged in conjunction with the ultrasonic device, a measured value for the width of a constituent material can be recorded continuously. This measured value is then used for the regulation of the size of the gap between the ultrasonic horn and the abutment. Control of the gap thus corresponds to control of the energy that is supplied in the course of treatment.

BRIEF DESCRIPTION OF DRAWINGS

A preferred illustrative embodiment is described below in relation to embodiment and with reference to the accompanying drawings, in which.

DETAILED DESCRIPTION OF PREFERRED EMBODIMENTS

Figure 1:
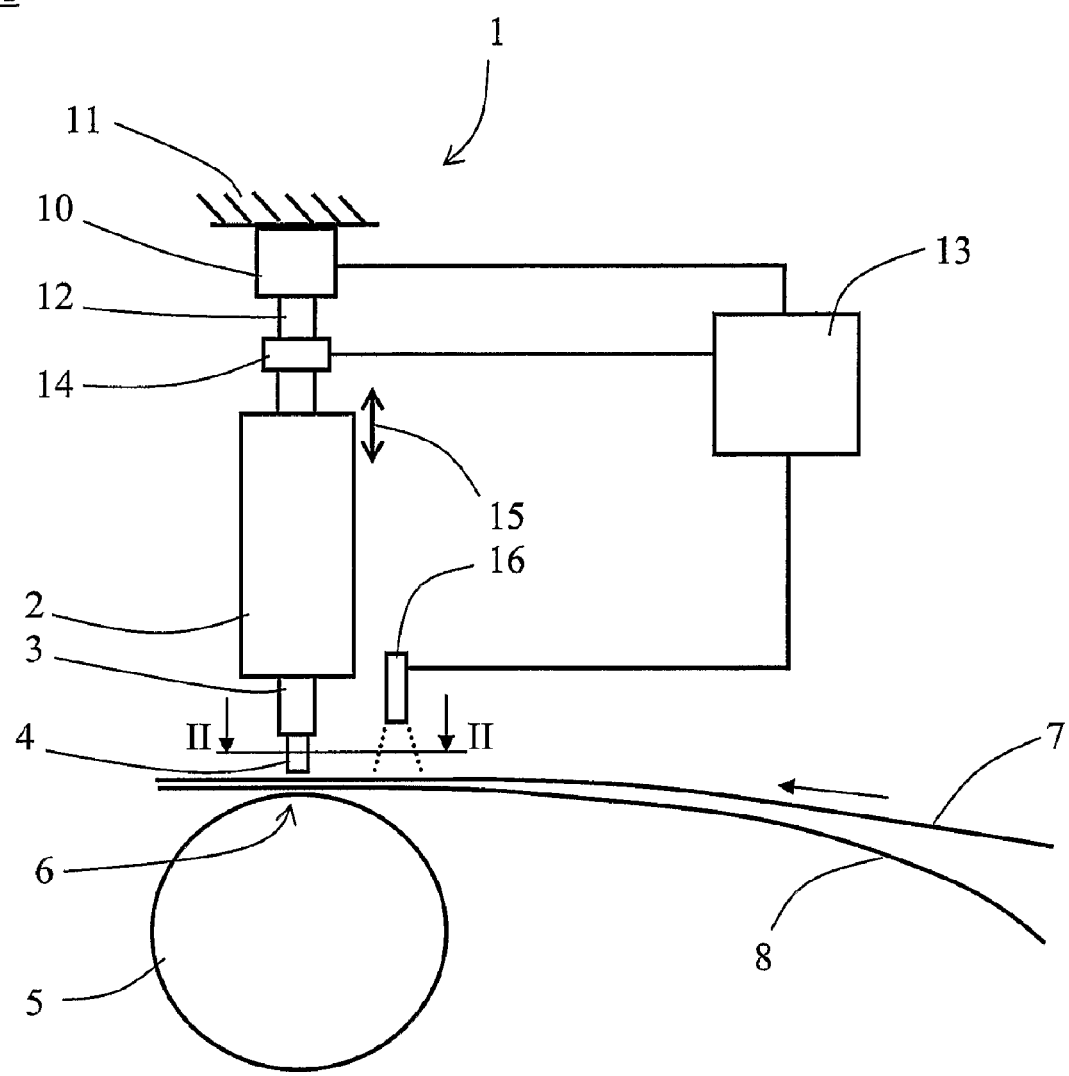
FIG. 1 is a schematic side view of an ultrasonic device intended to be used in conjunction with an embodiment of the present invention.

FIG. 1 is a schematic side view of an arrangement 1 for ultrasonic treatment. More precisely, in accordance with the prior art, the arrangement 1 comprises an ultrasonic device 2 with an ultrasonic horn 3, which in turn is executed with a contact device 4, that is to say an end part.

It can also be appreciated from FIG. 1 that the ultrasonic device 2 is arranged in close proximity to a rotating abutment roller 5, the periphery of which defines an abutment surface. More precisely, the contact device 4 of the ultrasonic horn 3 faces towards the material and is arranged with a small distance to the periphery of the abutment roller 5. A small gap 6, i.e. a relatively small distance between the contact device 4 and the peripheral surface of the abutment roller 5, is formed in this way. Through this gap 6 there is fed a laminate that consists of two layers 7, 8 of material, more precisely an upper layer 7 of material and a lower layer 8 of material. These layers 7, 8 of material consist of continuous webs of material that are fed from rollers (not shown here), from a folded material or similar, and onwards through the gap 6 in order to be joined together to form a laminate in a manner that will be described in greater detail below.

It must be noted here that FIG. 1 shows a preferred embodiment of the invention, which can be executed in alternative ways within the scope of the invention. For example, the layers of material in question need not consist of continuous webs of material, but may alternatively consist of individual cut pieces of material that are fed through the gap. Moreover, it is not necessary for the materials in question to be fed during their movement through the gap, but these materials can alternatively be positioned in the gap without being in motion during the actual ultrasonic treatment.

The principle of feeding webs of material through a gap in an ultrasonic device with the help of appropriate driving arrangements is previously disclosed, and for this reason this principle is not described in any greater detail here.

The ultrasonic device 2 is arranged for treatment by means of ultrasonic technology, for example in the form of welding, cutting, perforation, embossing or some other type of ultrasonic treatment. Treatment of the ultrasonic welding type, i.e. the joining together of two or more layers of material, is used in the embodiment that will be described below. The invention is not restricted to use solely for ultrasonic welding, however, but may be used alternatively in any other of the above-mentioned types of treatment.

The embodiment lends itself in particular to use in those applications in which the webs 7, 8 of material consist of nonwoven material, i.e. fibrous material with fibres such as polyolefins, for example, i.e. polymer materials such as polyethylene and polypropylene, or alternatively materials made of polyester, nylon or the like. Furthermore, mixtures of different types of fibre can be used for the webs 7, 8 of material. Such materials are used, among other things, in the manufacture of absorbent articles, for example in the form of diapers, incontinence pads, sanitary towels and panty liners. However, the invention is not restricted to use solely for the treatment of nonwoven material, but can also find an application in the in the treatment of other materials, for instance films of thermoplastics, for example polyethylene or polypropylene. The webs 7, 8 of material can also be materials made from natural fibres (e.g. wood or cotton fibres), foam materials or other materials that are capable of welding by means of ultrasonic treatment.

In the case of the manufacturing process in question, the ultrasonic device 2 is driven in a previously disclosed fashion, i.e. in such a way that the contact device 4 of the ultrasonic horn 3 is forced downwards above the layers 7, 8 of material while these are being advanced, in accordance with what is illustrated schematically by an arrow in FIG. 1 (i.e. to the left in FIG. 1). In conjunction with this, the ultrasonic device 2 is driven at a particular set frequency and power output, which results in the two layers 7, 8 of material being welded together. In accordance with this embodiment, this welding process can be appropriately performed on two layers 7, 8 of material that are arranged as illustrated in FIG. 1, although this can also be appreciated from FIG. 2, which is a view along the line II-II in FIG. 1, that is to say viewed transversely through the ultrasonic horn 3 and in a direct down towards the two layers 7, 8 of material. It can be appreciated from FIG. 2 that the upper layer 7 of material has a width $b_1$ that is smaller than the width $b_2$ of the lower layer 8 of material. These layers 7, 8 of material are intended to be welded together along the respective lateral edge 7a, 7b of the upper layer 7 of material and within a suitable area between these lateral edges 7a, 7b. This is indicated in particular in FIG. 2 with a welding pattern 9 that has been executed on the layers 7, 8 of material. More precisely, the welding pattern 9 is shown along the section of the layers 7, 8 of material that has just been fed past the ultrasonic horn 3, that is to say is positioned to the left of the ultrasonic horn 3 in FIG. 2 and as such has been laminated together. The welding pattern 9 is selected in a previously disclosed fashion through the choice of an appropriate corresponding design of the abutment roller 5.

It must be noted at this point that the invention can be applied to various configurations of layers of material, which are described below in greater detail with reference to FIGS. 6a and 6b. It must also be pointed out at this stage that the invention is not restricted to the particular configuration that is illustrated in FIG. 2 with two layers 7, 8 of material, where the second layer 8 of material is broader than the first layer 7 of material, and where the latter is positioned above the other layer 8 of material so that it ends up within its lateral edges.

Figure 2:
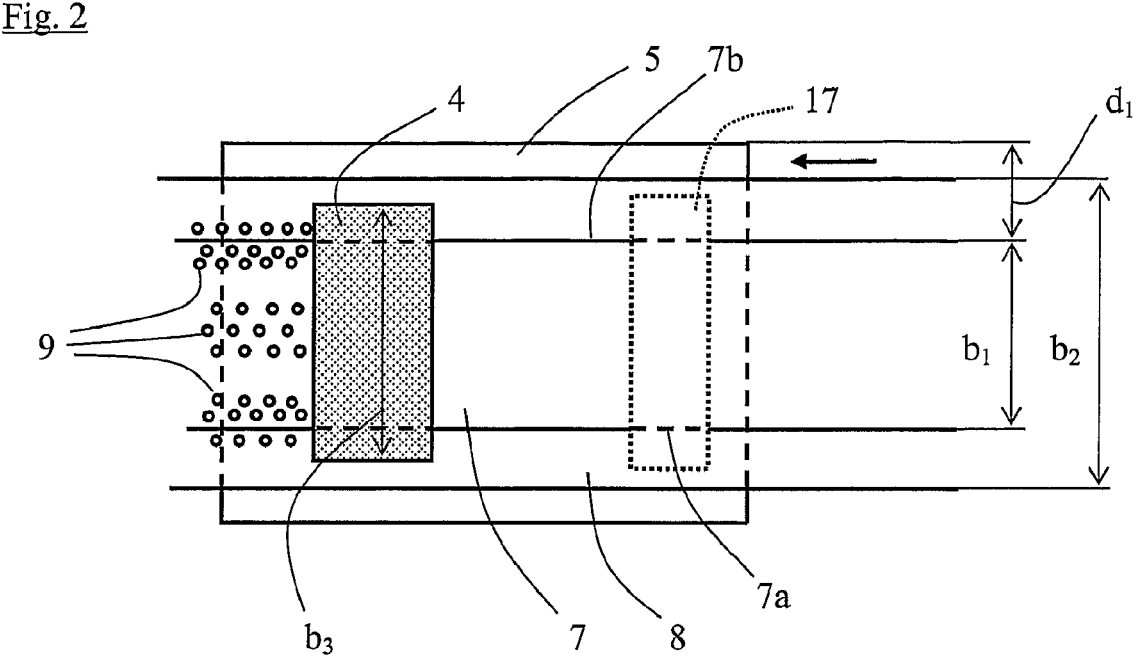
FIG. 2 shows a cross-sectional view along the line II-II in FIG. 1, slightly enlarged in relation to FIG. 1.

With reference to the embodiment illustrated in FIG. 2, it can be noted that the two layers 7, 8 of material are joined together in such a way that it is desirable for the lateral parts 7a, 7b of the upper layer 7 of material to be securely sealed. For this reason, the contact device 4 of the ultrasonic horn 3 is arranged with a cross section, the width $b_3$ of which is exceeds the width $b_1$ of the upper layer 7 of material, that is to say viewed in a direction running essentially transversely to the longitudinal direction of the layers 7, 8 of material. The longitudinal direction of the materials 7, 8 is indicated by an arrow in FIG. 2. As a consequence of the fact that the width $b_1$ of the upper layer 7 of material can vary to some extent in the longitudinal direction, the width $b_3$ of the contact device 4 of the ultrasonic horn must exceed the width $b_1$ of the upper layer 7 of material by a certain margin, in accordance with what can be appreciated from FIG. 2. The ultrasonic horn 3 also interacts with the abutment roller 5, the periphery of which is executed in a previously disclosed fashion (not illustrated here) in order to achieve the above-mentioned welding pattern 9. In accordance with what can be appreciated from FIG. 2, this welding pattern 9 also extends for a short distance beyond the lateral edges 7a, 7b of the upper layer 7 of material.

The welding pattern 9 that is selected can be executed in accordance with the prior art based on a number of factors, for example the desired performance of the finished product, the desired visual appearance of the finished product and with the intention of permitting efficient manufacture (i.e. dependent on process engineering requirements and wishes). The welding pattern 9 that is illustrated in FIG. 2 is only one example of how a welding pattern of this kind can be executed, and a great many other variants are possible within the scope of the invention, for example dependent on what type of treatment is desired and what characteristics are sought in the finished product.

As a consequence of the problem mentioned by way of introduction in respect of the thermal expansion of, among other things, the ultrasonic horn 3, the arrangement 1 is arranged for the regulation of the size of the gap 6. The intention is thus to ensure that a certain set and essentially constant level of energy is supplied to the layers 7, 8 of material in order to achieve the desired ultrasonic treatment. For this purpose, the ultrasonic device 2 is so arranged as to be capable of displacement in such a way that the position of the contact device 4 of the ultrasonic horn 3 can be varied in relation to the abutment roller 5. With further reference to FIG. 1, it can be appreciated that the arrangement 1 comprises a drive unit 10, which can consist of an electric motor or alternatively a hydraulic drive arrangement. The drive unit 10 is used for the adjustment of the position of the ultrasonic horn 3 in relation to the abutment roller 5. This takes place appropriately by the displacement of the entire ultrasonic device 2 in relation to the drive unit 10, which in turn is securely attached to a fixture 11 or the like in accordance with what is illustrated schematically in FIG. 1. The drive unit 10 is itself attached to the ultrasonic device 2 via a power transmission 12. The drive unit 10 is also connected electrically to a control unit 13, which is appropriately computer-based and so arranged as to control the drive unit 10 dependent on certain input signals, in accordance with what is described below in greater detail.

It must be pointed out that the embodiment can be executed alternatively in such a way that the abutment roller 5 is so arranged as to be capable of displacement, instead of the ultrasonic device 2. In accordance with a further variant, both the abutment roller 5 and the ultrasonic device 2 can be so arranged as to be capable of displacement with the intention of permitting regulation of the size of the gap 6.

Preferably arranged between the drive unit 10 and the ultrasonic device 2 is a sensor 14 for detection of the force F that acts upon the layers 7, 8 of material and the abutment roller 5 when the ultrasonic horn 3 is brought into contact with the layers 7, 8 of material. This sensor 14 is appropriately of the load cell type, which is in itself a previously disclosed type of sensor, which is based on the principle that a mechanical force is converted into an electrical output signal. As an alternative to a load cell, the invention can also be implemented with sensors, for example of the strain gauge or piezoelectric element type.

In accordance with what can be appreciated from FIG. 1, the load cell 14 is connected electrically to the control unit 13, which is thus so arranged, dependent on the signals relating to the measured force F received from the load cell 14, as to adjust the ultrasonic device 2 to an appropriate position in the vertical sense in relation to the abutment roller 5. In other words, the force F that acts upon the layers 7, 8 of material and the abutment roller 5 can be detected with the help of the load cell 14, and if the size of the gap 6 is changed, which can occur as a result of changes in the temperature in the ultrasonic device 2, the force F that is detected by the load cell 14 will also change. In order to maintain correct ultrasonic welding with the right quantity of supplied energy, the control unit 13 can thus be used to control the drive unit 10 in such a way that controlled displacement of the ultrasonic device 2 takes place in the vertical sense, as indicated schematically by an arrow 15 in FIG. 1. This displacement thus results in a controlled change in the size of the gap 6.

A fundamental principle is that a measurement of a certain dimension of a constituent layer of material is used for the adjustment of the size of the gap 6. In accordance with the illustrated embodiment, this dimensional measurement is so arranged that it is the width $b_1$ (see FIG. 2) of the upper layer 7 of material that is measured. This measured value for the width is then utilized for the adjustment of the size of the gap 6. Because the energy that is required in order to achieve a certain lamination strength in conjunction with ultrasonic welding—assuming a certain, set process speed—is dependent on the area of contact between the ultrasonic horn 3 and the abutment roller 5, any variations in the width $b_1$ of the upper layer 7 of material can lead to the situation in which the level of energy supplied is not optimal in order to achieve the desired welding sequence. If, for example, a certain section of the upper layer 7 of material (viewed in its longitudinal direction) exhibits a relatively small width $b_1$, the energy that is transmitted via the ultrasonic horn 3 will be relatively high, with the associated risk of damage to the constituent materials 7, 8. Conversely, it may be noted that, if a particular section of the upper layer 7 of material has a relatively large width $b_1$, the energy that is transmitted via the ultrasonic horn 3 will be relatively low, with the associated risk that the welded joints 9 will be incomplete.

Because the abutment roller 5 and the ultrasonic device 2 are arranged in such a way that the welding pattern 9 extends to some extent beyond the lateral edges 7a, 7b of the upper layer 7 of material, a contact surface is defined in this way between the contact device 4 of the ultrasonic horn 3 and that part of the welding pattern that is covered by both of the layers 7, 8 of material. This means that the contact area can be indicated as a function of the width of the material. The length of the contact surface is itself dependent on the diameter of the abutment roller 5 and the type of welding equipment used. This parameter remains constant for every specific application. The input energy required in order to achieve a certain lamination strength (assuming a specific process speed) can then be expressed as a function of the line speed and the contact area, where the latter parameter varies dependent on any variations in the width $b_1$. A process in which the line speed is kept constant, but where the width $b_1$ varies, will thus mean that the input energy will not be optimal for the intended welding process.

For the reasons outlined above, the width $b_1$ of the upper layer 7 of material is measured continuously. In accordance with the embodiment, measurement of the width is effected by means of a detection device in the form of an optical inspection unit, which appropriately consists of a camera 16 that is arranged adjacent to the layers 7, 8 of material. The camera 16 is appropriately so arranged that it permanently inspects and records images along a section 17 in accordance with what is illustrated schematically in FIG. 2. This section 17 extends for a short distance in the longitudinal direction of the materials 7, 8 and by a certain margin beyond the width $b_1$ of the uppermost layer 7 of material, that is to say in the transverse direction of the materials 7, 8. A signal corresponding to this measured value for the width is transmitted to the control unit 13 and is used for positioning of the ultrasonic device 2, that is to say for regulation of the size of the gap 6.

The camera 16 is of a previously disclosed kind and, in accordance with the embodiment, is a video camera that is used for the continuous recording of images within the section 17. More precisely, the camera 16 comprises an array of photosensitive elements, with the help of which it records the transmission of light within a large number of points which together constitute the section 17. In conjunction with measurement, the layers 7, 8 of material will be displaced relative to the camera 16 in the longitudinal direction of the layers 7, 8 of material. In the course of this relative movement, the camera 16 detects the transmission of light in the section 17, the extent of which thus passes over the lateral parts 7a, 7b of the upper layer 7 of material. Information in respect of the recorded images is transmitted to the control unit 13, which is in turn provided with software for image processing. This software is so arranged as to detect the respective position of the lateral parts 7a, 7b defined by the upper layer 7 of material when both of the layers 7, 8 of material pass under the camera 16. A measured value for the width $b_1$ of the upper layer 7 of material is obtained from the information about the distance between the lateral parts 7a, 7b within the inspected section 17. It must be noted that the invention is not restricted solely to the case in which the layer of material on which a width measurement is performed is positioned uppermost in a laminate. The invention can be used generally for a measurement of the width or a corresponding dimension of an elective material contained in the laminate, regardless of whether the material is uppermost in the laminate or occupies some other position in the laminate.

In accordance with an alternative embodiment, the camera can be of the CCD ("charged coupled device") type, for example, i.e. with an array of photosensitive sensors arranged in one or a plurality of rows. The intensity of the light in the section 17 can be detected with the help of this arrangement. In the same way as in the case of a video camera, the signal relating to the intensity of the light in the section 17 can be transmitted to the control unit 13 for further image analysis and processing, so that a measured value for the width $b_1$ is obtained. According to further alternatives, the detection device can be based on laser technology, for example, that is to say with a laser light source that is used, in association with a photosensitive detector, for the purpose of determining the width $b_1$. In accordance with further embodiments, the detection device can be based on IR technology or can utilize a microwave sensor.

Figure 3:
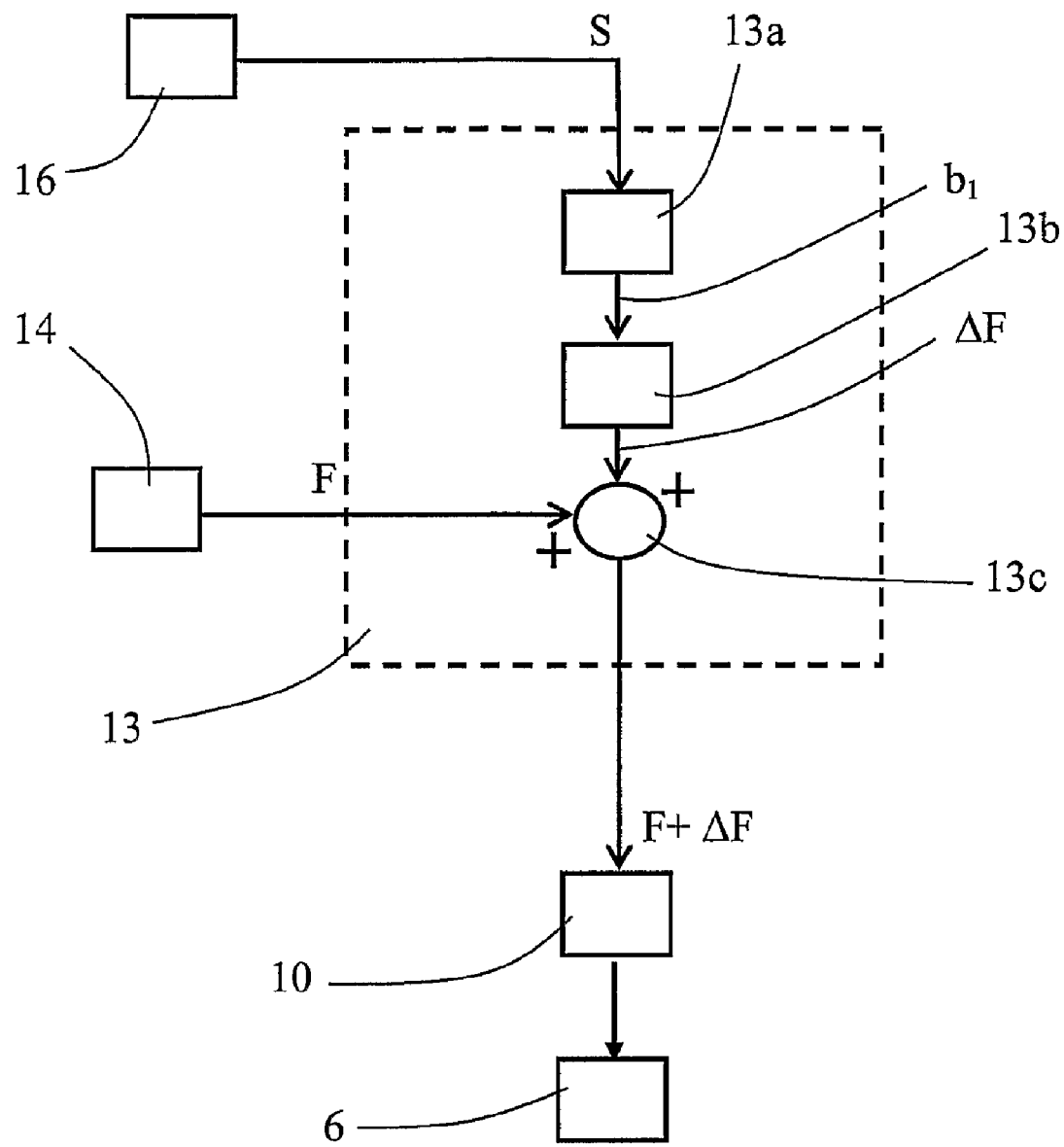
FIG. 3 illustrates schematically how an embodiment of the invention is used to regulate the ultrasonic device.

FIG. 3 illustrates schematically and in modular form how the determination of the width $b_1$ of the upper layer 7 of material is utilized for the purpose of regulating the size of the gap 6. Certain of the components described above are also illustrated in FIG. 3, although in this instance in the form of functional modules in order to illustrate the function for regulating the size of the gap 6. It can be noted in this case that the camera 16 is used for recording a signal S that is fed to the control unit 13 for the purpose of determining the width $b_1$. In parallel with this, the above-mentioned load cell 14 is used for the purpose of detecting the force F which acts upon the two layers 7, 8 of material and the abutment roller 5.

The control unit 13 comprises a functional module 13a in the form of appropriately designed hardware and software that is so arranged, taking as its starting point the signal S, as to calculate a value which indicates a measured value for the width $b_1$ of the upper layer 7 of material. This width dimension $b_1$ is converted into a correction factor $\Delta F$ in a second functional module 13b. This conversion process is described below. The correction factor $\Delta F$ is then added to the aforementioned value for the force F, which takes place in a third functional module 13c that is arranged for the aforementioned addition. The correction factor $\Delta F$ thus corresponds to a value which makes a correction for the change in the supplied welding energy that is required as a result of variations relating to the aforementioned width $b_1$. The function which indicates the effect of the width $b_1$ on the correction of the welding energy is appropriately derived theoretically and/or via empirical studies of the energy required for different widths of material. Account is also taken here of the welding pattern (not illustrated) that is present on the abutment roller 5 and which defines the design of the welded seams 9.

A signal from the third functional module 13c thus constitutes an output signal from the control unit 13, which corresponds to the combined value $F+\Delta F$. This output signal is then fed to the above-mentioned drive unit 10, which in turn regulates the size of the gap 6 so that essentially uniform and optimal welding energy is supplied to the two layers 7, 8 of material during operation with the ultrasonic device 2.

It must be noted that the control unit 13 is indicated schematically with dashed lines in FIG. 3, in order to indicate that the three above-mentioned functional modules 13a, 13b, 13c comprise the hardware and software designed for the purpose in the aforementioned control unit 13.

Figure 4:
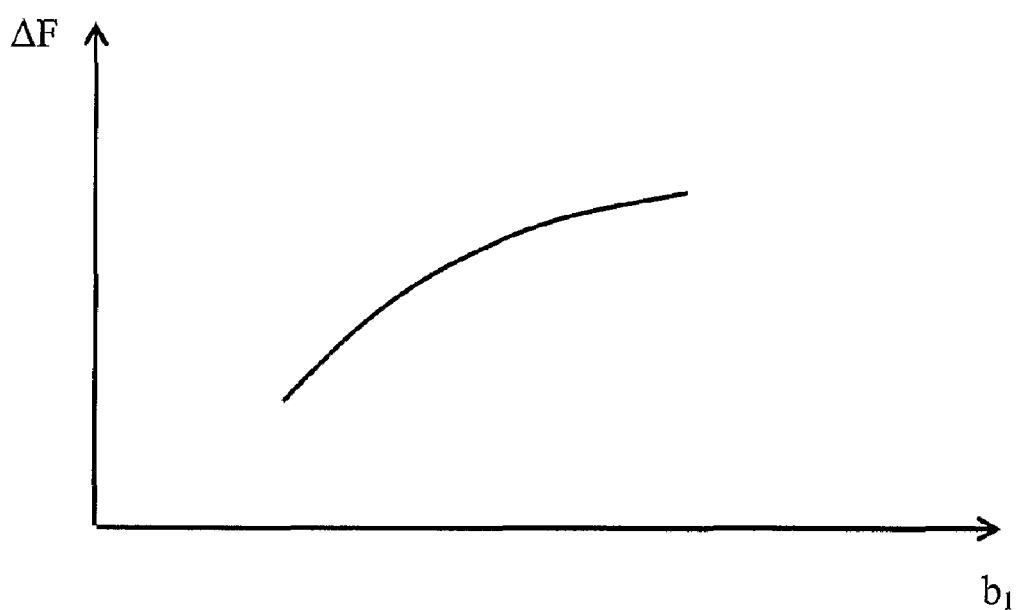
FIG. 4 shows a curve which indicates the relationship between a measured dimension and a correction that is intended to be used for regulation in accordance with an embodiment of the invention.

With reference to FIG. 4, a curve is presented which indicates a relationship between the measured value for the width $b_1$ of the upper layer 7 of material and the correction factor $\Delta F$ that is obtained with the help of the functional module 13b (see FIG. 3). It can be noted in this instance that the appearance of the curve shown in FIG. 4 corresponds to the conversion from the measurement for the width $b_1$ to the correction factor $\Delta F$ that is added to the signal which corresponds to the force F. The appearance of the curve corresponds to a theoretical relationship that is preferably based on the appearance and the function of the welding pattern that is used. The welding pattern that is used in this instance is normally in the form of a plurality of raised points positioned around the periphery of the abutment roller 5. The number of raised points, their positions, their dimensions and concentration, etc., then together determine how the transformation from the width dimension to the correction factor will take place. The curve in this instance is produced as a previously determined relationship between the measured width $b_1$ and a correction factor $\Delta F$ that is added to a measured value for the force F in order to provide an optimal adjustment of the size of the gap 6, i.e. in order to supply the correct welding energy into the layers 7, 8 of material.

The invention can thus be used generally to control the energy content of the welding process dependent on the width $b_1$ of the upper layer 7 of material. The curve in accordance with FIG. 4 is conveniently stored in the control unit 13, so that the value of the width $b_1$ can be transferred simply to a measured value for the correction factor $\Delta F$. This also means that different treatment processes, in which different types of abutment roller and even different types of welding pattern are used, will also give a different appearance to the curve in accordance with FIG. 4. This in turn means that the invention can be used in such a way that a change of abutment roller can be recorded in the control unit in an appropriate fashion, so that the control unit 13 always contains correct information about what welding pattern is being used. With the help of this information, a corresponding curve can then be used for the conversion from the width $b_1$ to the correction factor $\Delta F$.

To sum up, it can be established that continuously adapted energy can be provided to the ultrasonic treatment of the materials 7, 8. The system and the method in accordance with the invention are particularly suitable to be used for the purpose of sealing, for the most part continuously along an edge, which may be the case, for example, for certain material laminates used for absorbent articles. In one practical application, the width $b_1$ of the upper layer 7 of material can exhibit a variation in its longitudinal direction of the order of magnitude of ±20 mm, which corresponds to a variation in force from the ultrasonic horn 3 of the order of magnitude of ±125 N. This influence on the width $b_1$ of the upper layer 7 of material is particularly noticeable at relatively high process speeds and in those applications which require a continuous welded seam along one edge. The measured value for the width is then in relation to the energy which appropriately requires to be supplied to the layers of material in order for the ultrasonic treatment to be optimal.

As an alternative to the dimensional measurement in relation to the width $b_1$ of the upper layer of material, the invention can also be applied to the measurement of another dimension, such as the thickness of one or other of the layers 7, 8 of material, or alternatively the combined thickness of the layers 7, 8 of material. As a further alternative, a combination of the width and the thickness can be used for the regulation in accordance with the invention.

A further alternative in relation to dimensional measurement involves the continuous measurement of the position of one edge 7b of the upper layer 7 of material calculated from a reference point, which may be represented by one edge of the abutment roller 5, for example. This measured value is indicated by the reference designation $d_1$ in FIG. 2. By analogy with what is indicated above, the size of the gap 6 in this instance can be adjusted dependent on the instantaneous position of the edge 7b of the layer 7 of material, which can be detected with the help of the camera 16.

The embodiment described above is based on the use of a load cell 14 to supply a signal relating to the generated force F from the ultrasonic device 2, in conjunction with which the measured value for the width $b_1$ has been used to define a correction factor $\Delta F$. It must be noted that the invention can be implemented in principle even in those cases in which no load cell is present. In such cases, the width dimension alone, or alternatively in combination with some other parameter, can be used for regulation of the size of the gap.

Figure 5:
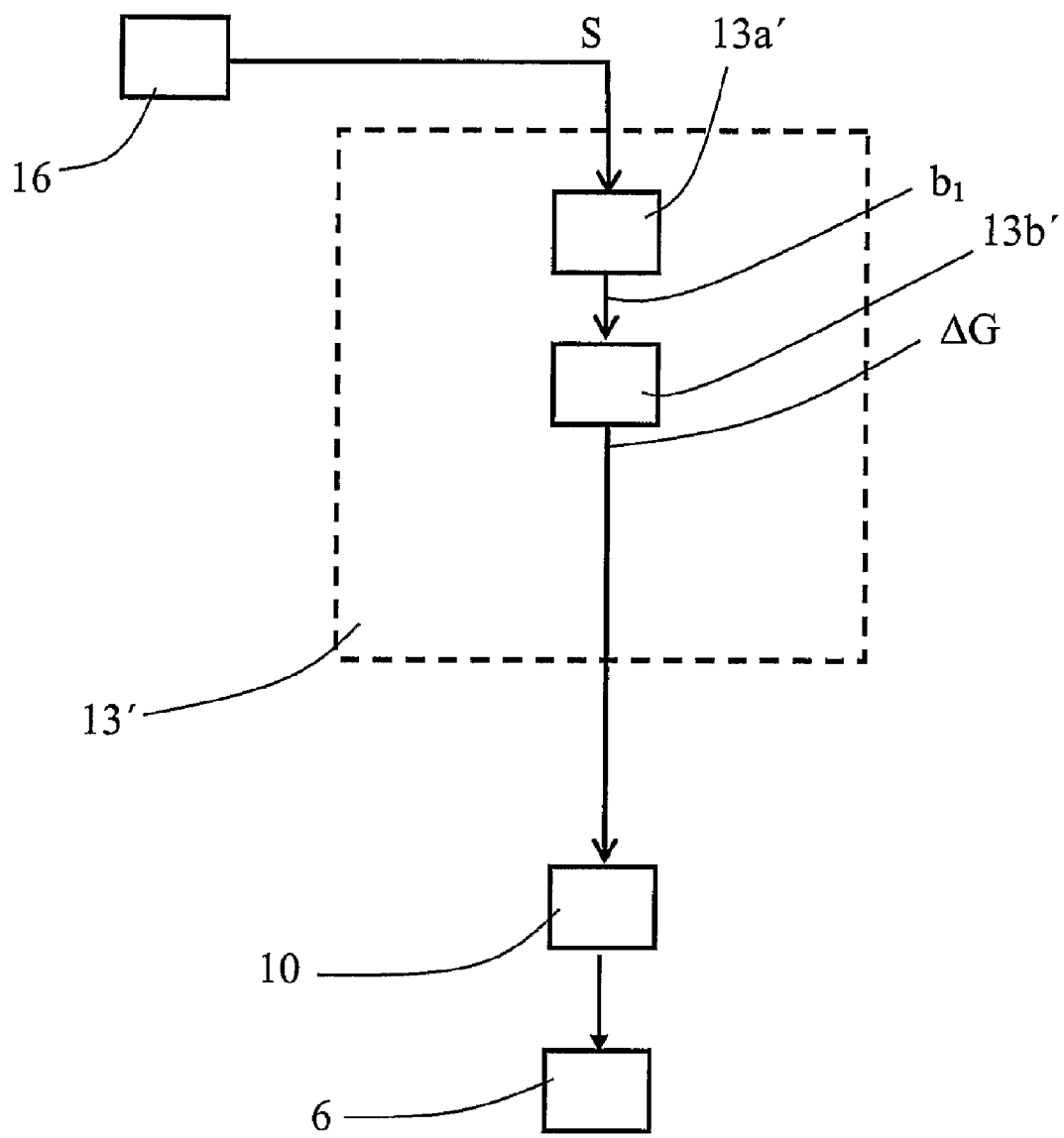
FIG. 5 shows schematically how an embodiment of the invention can be used alternatively for regulation of the ultrasonic device.

With reference to FIG. 5, an alternative solution is illustrated, which does not make use of a load cell, but generally only utilizes a certain dimensional measurement as the input parameter, appropriately the measured value for the width $b_1$ of the upper layer 7 of material. The control unit 13' in accordance with FIG. 5 in this instance comprises a functional module 13a' in the form of appropriately designed hardware and software that is so arranged, taking as its starting point the signal S from the camera 16, as to calculate a value which indicates a measured value for the width $b_1$ of the upper layer 7 of material. This width dimension $b_1$ is converted in a second functional module 13b into a correction factor $\Delta G$, which then corresponds to an electrical signal that will be supplied to the drive unit 10, which in turn regulates the size of the gap 6 so that essentially uniform and optimal welding energy is supplied to the two layers 7, 8 of material during operation with the ultrasonic device 2. In this alternative embodiment, too, the correction factor $\Delta G$ thus corresponds to a value which makes a correction for the change in the supplied welding energy that is required as a result of variations relating to the aforementioned width $b_1$.

The invention is generally suitable for use in conjunction with treatment by means of a thermomechanical or mechanical joining process with an associated requirement for supplied energy dependent on the width of the material or some other equivalent parameter. Mention may be made by way of example of welding applications which require a welding pattern that is broader than at least one or other of the constituent materials.

Figure 6A:
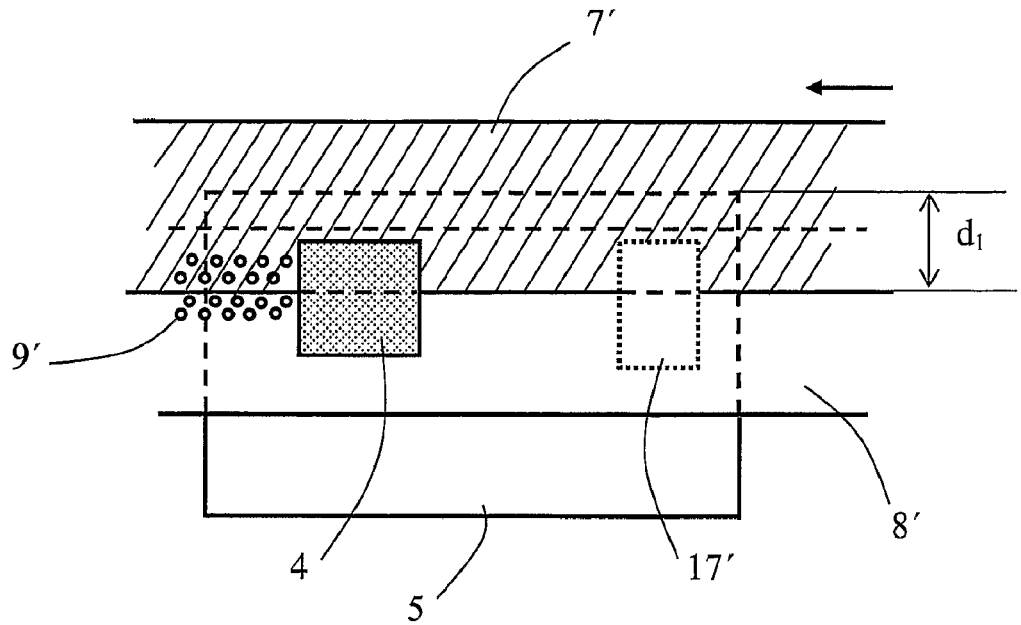
FIGS. 6*a-b* illustrate alternative material configurations.

FIG. 6a corresponds to the view in accordance with FIG. 2, but illustrates an alternative embodiment of the invention, where a different configuration of material is used. FIG. 6a thus shows a case in which a first layer 7' of material must be joined to a second layer 8' of material, although only so that they overlap one another partially. This differs from the variant that can be appreciated from FIG. 2, where the first layer 7 of material is positioned entirely within the lateral edges of the second layer 8 of material.

In accordance with what can be appreciated from FIG. 6a, the first layer 7' of material is identified specially with inclined lines for the sake of clarity. The first layer 7' of material is accordingly positioned above the second layer 8' of material. Alternatively, the first layer 7' of material can be positioned under the second layer 8' of material. With the help of ultrasonic treatment, the layers 7', 8' of material must be joined together along their respective edges so that a welding pattern 9' is formed. A detection device 16, appropriately a camera, is used in this case, too, although appropriately to detect the dimension $d_1$, which indicates the distance from the one edge 7a' of the upper layer 7' of material to a reference point, appropriately the side of the abutment roller 5 or some other fixed reference point. For this purpose, the camera 16 thus analyzes a section 17' which extends over an area where it is expected that the edge 7a' of the first layer 7' of material will be positioned. A width dimension is not used here, therefore, but instead a dimensional measurement in the form of the change in position of the edge in a direction which runs essentially transversely to the longitudinal direction of the material.

Figure 6B:
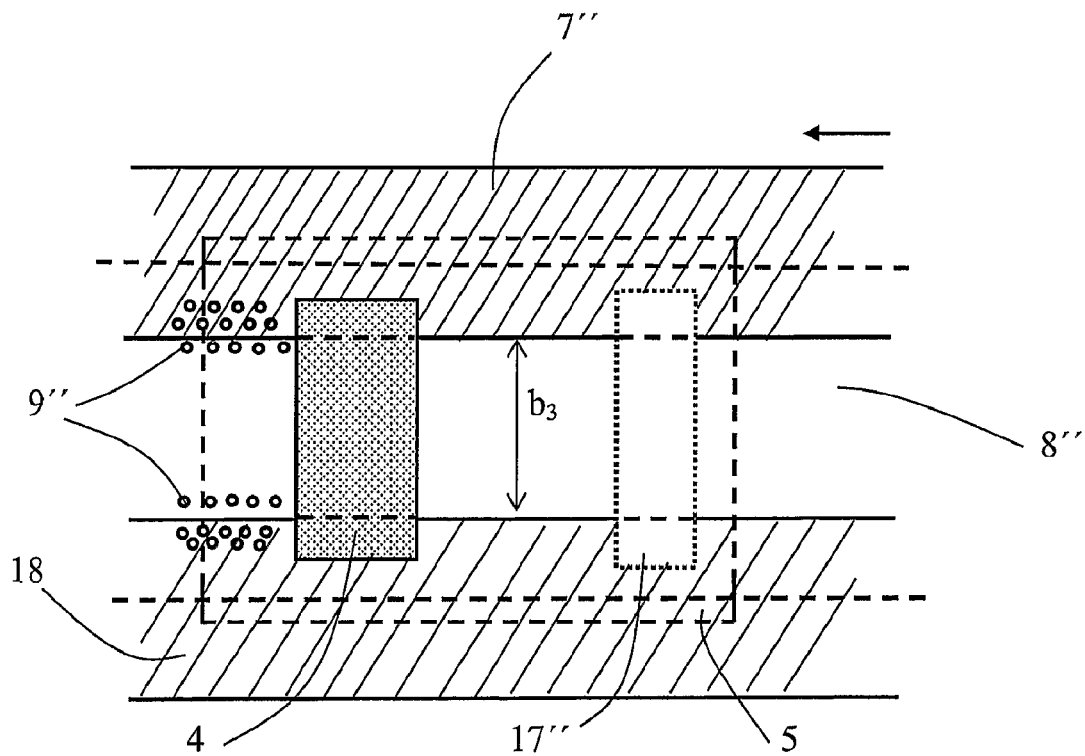

FIG. 6b shows a further variant of the invention, in which three different materials are used, more precisely a first layer 7" of material, which partially overlaps a second layer 8" of material in the same way as in FIG. 6a. Also present is a third layer 18 of material, which overlaps the opposite side of the second layer 8" of material. In this configuration, an ultrasonic device is used to produce welding patterns 9" along the two edges that are defined where the materials overlap one another. In this variant, the invention can be utilized by measuring the distance $b_3$ between the mutually facing edges of the first layer 7" of material and the third layer 18 of material. This measured value can thus be used in a manner that is analogous to that described above for the purpose of adjusting the size of the gap on the ultrasonic device.

By analogy with what is mentioned above, the dimensional measurement of the material configurations in accordance with FIGS. 6a and 6b is not restricted to the one or more materials that are uppermost in a material laminate, but can be performed on all the constituent materials in the laminate.

The invention is not restricted to what is indicated above, and various embodiments are possible within the scope of the patent Claims and equivalents thereof. For example, the invention is not restricted solely to welding, but can be used for other types of treatment by means of ultrasonic technology, where a parameter that is dependent on a measured dimension of the upper 7 layer of material is utilized for regulation of the size of the gap 6. The invention can also be utilized for other types of material, for example nonwoven material, or other types of synthetic or textile material. The invention can be applied to different types of laminate with a varying number of constituent layers of material.

The arrangement in accordance with the invention can be executed with different types of control system for regulating the input welding energy, on condition that it is able to handle the measured signal and the feedback signal relating to the width measurement.

The system can be used in conjunction with a stationary ultrasonic horn, that is to say non-rotating but capable of movement in relation to the abutment, or alternatively with a rotatable ultrasonic horn and a stationary abutment surface.

Other types of abutment surfaces can also be used as an alternative to the above-mentioned abutment roller 5. For example, the abutment surface can be defined by a plane surface which functions as an abutment.

The invention claimed is:

1. An arrangement for treatment of a material comprising at least two layers of material by means of an ultrasonic device comprising an ultrasonic horn arranged in conjunction with an abutment, wherein the material is positioned in a gap that is defined between the ultrasonic horn and the abutment, and the ultrasonic horn or the abutment is so arranged as to be capable of displacement to permit adjustment of the size of the gap, the arrangement further comprising: (a) a control unit for regulation of the size of the gap dependent on energy supplied to the material in the course of the treatment, (b) a detection device for determination of at least one predetermined dimension of the material, in conjunction with which the control unit is arranged for the regulation of the size of the gap dependent on at least the dimension, wherein the dimension comprises a width of at least one of the layers of material in a direction running essentially transversely to the longitudinal direction of the material, and (c) a sensor for measurement of force with which the ultrasonic device acts upon the material and the abutment, in conjunction with which the control unit is arranged for the regulation of the size of the gap dependent on the force, wherein the control unit is capable of calculating a measured value of the width, converting the measured value of the width to a correction factor, and adding the correction factor to the value which corresponds to the force during the regulation.

2. The arrangement according to claim 1, wherein the relationship between the measured value of the width and the correction factor is determined by the design and function of a welding pattern that is executed in the abutment.

3. The arrangement according to claim 1, wherein the detection device comprises optical inspection of a predetermined section of the material, which device consists of a video camera or CCD arrangement.

4. The arrangement according to claim 1, wherein the abutment comprises a rotating abutment roller.

5. The arrangement according to claim 1, wherein the ultrasonic device is arranged for treatment in the form of ultrasonic welding of at least two layers of material to form a laminate.

6. The arrangement according to claim 1, wherein the layers of material comprise an upper layer of material that is arranged for welding to a lower layer of material, in conjunction with which the upper layer of material has a smaller width than the width of the lower layer of material, and in conjunction with which welded seams are defined along lateral edges of the upper layer of material.

7. A method for treatment of a material comprising at least two layers of material by means of an ultrasonic device comprising an ultrasonic horn arranged in conjunction with an abutment, the method comprising:

positioning of the material in a gap that is defined between the ultrasonic horn and the abutment, adjustment of the size of the gap by means of a movable adjustment of the ultrasonic horn or the abutment, regulation of the size of the gap dependent on energy supplied to the material in the course of the treatment, detection of at least one predetermined dimension in the material, wherein the dimension comprises a width of the material in a direction running essentially transversely to the longitudinal direction of the material, and regulation of the size of the gap dependent on at least the dimension;

wherein the method additionally comprises:
measurement of force with which the ultrasonic device acts upon the material and the abutment, and regulation of the size of the gap dependent on the force; and
conversion of a measured value of the width to a correction factor that is added to the value which corresponds to the force during the regulation.

8. The method according to claim 7, wherein the determination of at least one predetermined dimension of the material takes the form of optical inspection of a predetermined section of the material.

9. The method according to claim 7, wherein the treatment comprises ultrasonic welding of at least two layers of material.

10. The arrangement according to claim 1, wherein the control unit comprises a first module for calculating a measured value of the width, a second module for converting the measured value of the width to a correction factor, and a third module for adding the correction factor to the value which corresponds to the force during the regulation.

* * * * *